United States Patent
Agrawal et al.

(10) Patent No.: US 8,432,960 B2
(45) Date of Patent: Apr. 30, 2013

(54) DIGITAL ADAPTIVE CHANNEL EQUALIZER

(75) Inventors: Girraj K. Agrawal, Noida (IN); Asif Iqbal, Allahabad (IN); Akshat Mittal, New Delhi (IN); Ankit Pal, Ghaziabad (IN); Amrit P. Singh, Ludhiana (IN)

(73) Assignee: Freescale Semiconductor, Inc., Austin, TX (US)

( * ) Notice: Subject to any disclaimer, the term of this patent is extended or adjusted under 35 U.S.C. 154(b) by 533 days.

(21) Appl. No.: 12/727,189

(22) Filed: Mar. 18, 2010

(65) Prior Publication Data

US 2011/0228839 A1 Sep. 22, 2011

(51) Int. Cl.
*H03H 7/30* (2006.01)

(52) U.S. Cl.
USPC ........... 375/232; 375/343; 375/355; 375/360; 375/346; 370/465; 370/328

(58) Field of Classification Search ............... 375/232, 375/343, 346, 360; 370/465, 328
See application file for complete search history.

(56) References Cited

U.S. PATENT DOCUMENTS

| | | | |
|---|---|---|---|
| 2006/0291501 A1* | 12/2006 | Nicol et al. | 370/465 |
| 2009/0310666 A1* | 12/2009 | Yamaguchi et al. | 375/232 |
| 2010/0172400 A1* | 7/2010 | Chou | 375/232 |
| 2011/0096875 A1* | 4/2011 | Amrutur et al. | 375/343 |

OTHER PUBLICATIONS

Kwisung Yoo, Gunhee Han and Hongil Yoon, Convergence Analysis of the Cascade Second Order Adaptive Line Equalizer, IEEE Transactions on Circuits and Systems—II: vol. 53, No. 6, Jun. 2006.

Axel Thomsen et al., "Introduction to the Special Issue on the 2005 IEEE International Solid-State Circuits Conference", IEEE Journal of Solid-State Circuits, vol. 40, No. 12, Dec. 2005, pp. 2359-2363.

Troy Beukema et al., "A 6.4-Gb/s CMOS SerDes Core With Feed-Forward and Decision-Feedback Equalization", IEEE Journal of Solid-State Circuits, vol. 40, No. 12, Dec. 2005, pp. 2633-2645.

* cited by examiner

*Primary Examiner* — Eva Puente

(74) *Attorney, Agent, or Firm* — Charles Bergere

(57) ABSTRACT

A channel equalizer that compensates for signal distortion of a signal in a communication channel includes an equalization filter, which gain-equalizes a received signal received through the communication channel, and an equalization control circuit, which generates a gain control signal for controlling the gain of the equalization filter. The equalization control circuit specifies a phase switch in data obtained by the equalization filter as an isolated bit and generates the gain control signal based on a width of the isolated bit.

12 Claims, 2 Drawing Sheets

DIGITAL ADAPTIVE CHANNEL EQUALIZER

BACKGROUND OF THE INVENTION

The present invention relates to a digital adaptive channel equalizer suitable for use with a high-speed serial interface (HSSI).

Communication through a band-limited channel is affected by inter-symbol interference (ISI), which is dependent on signal frequency and channel characteristics. When a signal is distorted by ISI, an eye pattern (eye opening) closes at an input of a receiver. As a result, the recovery of transmission data becomes difficult, and the Bit Error Rate (BER) increases. Also, the degree of distortion (amplitude or phase distortion) caused by the communication channel varies based on factors such as the bandwidth, length, and attenuation of the channel. The effect of the distortion is more pronounced in a communication channel that operates at frequency bands exceeding 1 GHz, particularly, multi-Gbps bands. For such high speed serial communication on a band limited channel, a channel equalizer is used to equalize waveforms by compensating for waveform distortion, which includes ISI.

Channel equalizers are broadly classified as analog equalizers and digital equalizers. "Convergence Analysis of the Cascade Second Order Adaptive Line Equalizer" by Kwisung Yoo, Gunhee Han and Hongil Yoon, IEEE Transactions on Circuits and Systems II, Vol. 53, No. 6, June 2006 describes an example of an analog equalizer. A typical analog equalizer includes analog components such as an equalization filter and an amplifier. In addition, the analog equalizer uses complex analog circuits adapted to handle a high serial bit rate frequency (e.g., GHz). An analog custom circuit is used to equalize the received data prior to converting the received data to digital data.

FIG. 1 shows one example of a conventional receiver system 10 including an analog equalizer (analog adaptive channel equalizer). The analog equalizer includes an equalization filter 12, a slicer 14, and an equalization control circuit 16. The equalization filter 12 includes a variable gain amplifier (hereinafter VGA) 18 and receives serial data transmitted through a communication channel (not shown) as received signal r(t). Further, the equalization filter 12 receives a gain control signal 20 from the equalization control circuit 16 and adjusts the gain of the VGA 18 based on the gain control signal 20 to set an equalization amount (i.e., distortion cancellation amount) of the received signal r(t). The slicer 14 receives an input signal q1(t) from the equalization filter 12 and converts the input signal q1(t) to an output signal q2(t) of defined slew rate.

The equalization control circuit 16 includes first and second scalars 22 and 24, an adder 26, and an integrator 28. The first and second scalars 22 and 24 respectively calculate the slew rates of the input and output signals q1(t) and q2(t) of the slicer 14. The adder 26 adds the output values of the first and the second scalars 22 and 24 and generates an error sum e(t). The integrator 28 integrates the sum e(t) and generates the gain control signal 20. With this structure, the equalization control circuit 16 calculates a slew rate error of the received signal r(t) by detecting the amplitude of the received signal and determines a gain adjustment amount (gain control signal 20) of the VGA 18 in accordance with the calculated slew rate error. Thus, the analog equalizer of FIG. 1 uses the slew rate error of the received signal r(t) as criteria for adaptive control (gain equalization control).

FIG. 2 is a waveform diagram showing an example of the operation of the analog equalizer of FIG. 1. When receiving serial data ("TX OUTPUT") that is transmitted over the channel, the equalization control circuit 16 detects distortions in the rising and falling edges of the serial data to determine the gain adjustment amount of the equalization filter 12 to cancel such distortions.

Referring again to FIG. 1, the output signal q2(t) of the slicer 14 is provided via a differential amplifier 30 to an over sampler 32. The over sampler 32 over-samples the (serial data) output by the differential amplifier 30 under the frequency control of a phase lock loop (PLL) circuit 34. Here, "over-samples" refers to taking multiple samples of a received bit over the bit duration guided by multiple clock phases generated by the PLL circuit 34. A clock data recovery (CDR) circuit 36 determines the sign of the received serial data based on the over sampled bits output from the over sampler 32 and outputs the extracted data.

In this manner, a conventional analog adaptive channel equalizer includes not only the equalization filter 12 but also a large number of analog components such as the slicer 14 and the equalization control circuit 16. Thus, the conventional analog adaptive channel equalizer generally requires a long design time and large circuit areas. Further, the analog equalizer has poor design flexibility and reusability and is difficult to test. Thus, facilitated design, or so-called first-pass silicon, is relatively difficult to realize.

"A 6.4-Gb/s CMOS SerDes Core With Feed-Forward and Decision-Feedback Equalization", in IEEE JOURNAL OF SOLID-STATE CIRCUITS, Vol. 40, No. 12, December 2005 describes an example of a digital equalizer. A typical digital equalizer such as a decision-feedback equalizer (DFE) calculates the channel-impulse response represented in the form of tap coefficients of the equalization filter. Further, the DFE generates a weighted sum of previous samples that can be used as a correction signal for canceling out ISI in the received sample. Here, weighted sum is based on the values of filter tap coefficients. The cancellation of the ISI is performed at the serial bit rate. Thus, a timing critical path may be produced if the DFE is applied to the receiver of a high-speed serial interface, particularly, at multi-Gbps bands. Normally, a separate custom circuit must be implemented to close the timing for such a critical path. Additionally, in an equalizer such as a DFE, the calculation of the weighted sum is computation intensive. This makes the overall channel equalization scheme more complex.

It would be advantageous to have a digital equalizer designed for flexibility, ease of implementation, and reusability, and which has a relatively small foot print.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF THE INVENTION

Figure 1:
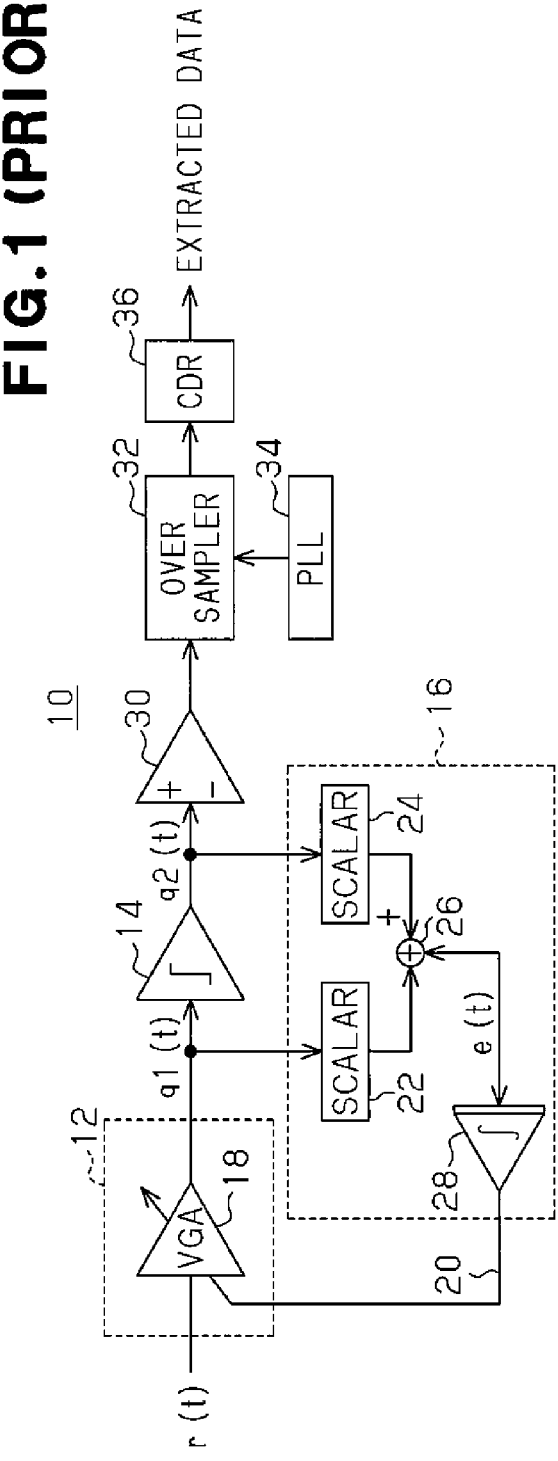
FIG. 1 is a schematic block circuit diagram of a conventional receiver system including an analog adaptive channel equalizer.
Figure 2:
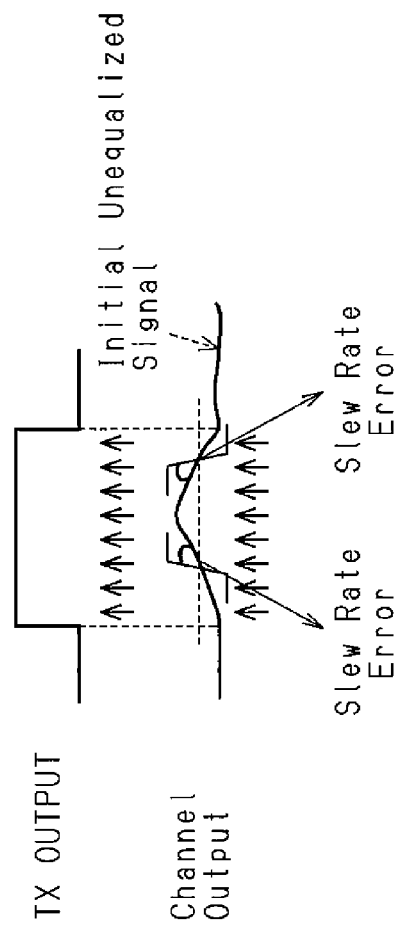
FIG. 2 is a waveform diagram showing an example of the operation of the analog equalizer shown in FIG. 1.

The present invention provides a simple digital adaptive channel equalizer suitable for application to a high-speed serial interface.

The terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Unless stated otherwise, terms such as "first" and "second" are used to arbitrarily distinguish between the elements such terms describe. Thus, these terms are not necessarily intended to indicate temporal or other prioritization of such elements. In addition, the word "coupled" refers to elements being in electrical communication with each other, whether directly connected e.g., via wires, or in some other manner.

The present invention provides a simple digital equalization scheme with a digital channel adaptation circuit that is not based on a decision feedback equalizer. That is, instead of using amplitude or slew rate for adaptive control like the analog implementation, the channel adaptation circuit uses a width of an isolated bit scheme, where an isolated bit is a received bit (at the receiver input) having a polarity that is opposite to the immediately preceding and following bits (e.g., 010, 101); this is also referred to as a phase switch. The width of the isolated bit is calculated by counting the number of clock phases in an isolated bit after the received signal has been over sampled. The adaptive control is based on "width error", which is calculated by finding the difference between a measured width and an expected width of the bit. Based on the width error, digital gain control of the Variable Gain Amplifier (VGA) is thus provided at lower frequency. Unlike a DFE scheme, this scheme does not involve high frequency timing critical paths.

One aspect of the present invention is a channel equalizer that compensates for distortion, which includes ISI, of a signal in a communication channel. The channel equalizer includes an equalization filter that gain-equalizes a received signal received over the communication channel. An equalization control circuit controls the gain of the equalization filter. The equalization control circuit identifies an isolated bit from a phase switch in data obtained by the equalization filter and generates a gain control signal based on a width of the isolated bit, after the data output by the equalization filter has been over sampled. The width of the isolated bit is calculated by counting the number of clock phases in the isolated bit.

A further aspect of the present invention is a receiver system for receiving a signal over a communication channel. The received signal may be a signal transmitted by multi-Gbps serial interfaces over a band limited communication channel. The receiver system includes an equalization filter that gain-equalizes the received signal. An oversampling circuit acquires a plurality of over sampled bits from data obtained by the equalization filter. An equalization control circuit identifies an isolated bit as a phase switch in the originally transmitted (received) signal after the received signal has been over sampled and generates a gain control signal based on a width of the isolated bit.

Figure 3:
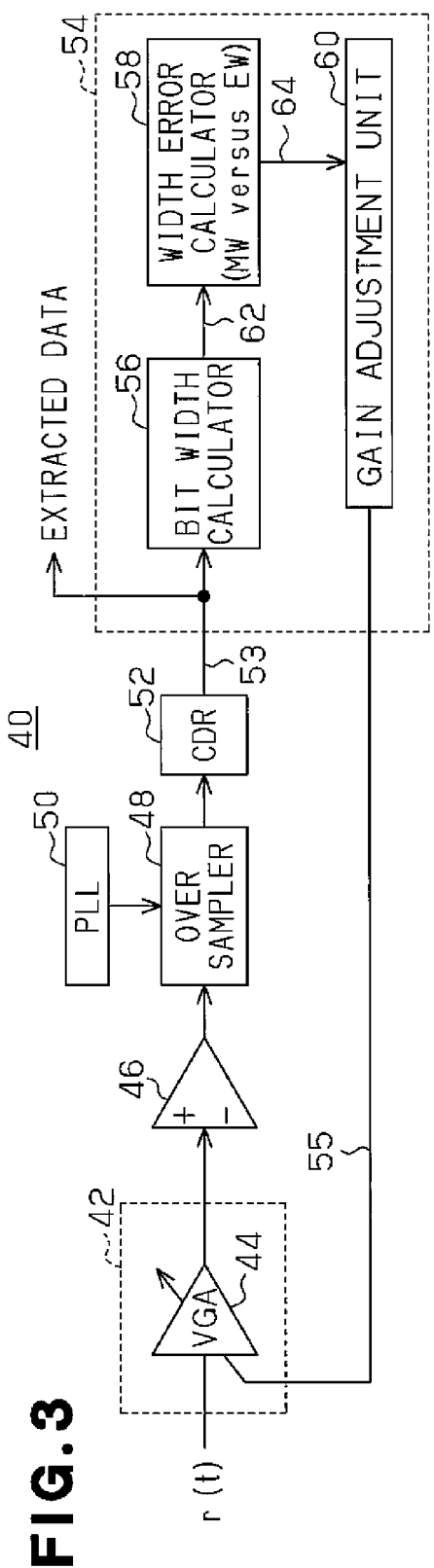
FIG. 3 is a schematic block circuit diagram of a receiver system including a digital adaptive channel equalizer according to one embodiment of the present invention.

Referring now to FIG. 3, a schematic block diagram of a receiver system 40 including a digital adaptive channel equalizer (hereinafter referred to as the digital equalizer) according to one embodiment of the present invention is shown. The receiver system 40 includes an equalization filter 42 having a VGA 44, a differential amplifier 46, an oversampling circuit 48, a PLL circuit 50, and a CDR circuit 52, which are similar to the corresponding circuits shown in FIG. 1. The equalization filter 42, the differential amplifier 46 (receiver), the oversampling circuit 48, and the PLL circuit 50 are analog circuits, and the CDR circuit 52 is a digital circuit. The equalization filter 42 receives an input signal r(t), which is a data sequence, transmitted over a communications channel. The input signal r(t) is processed and the CDR 52 outputs an extracted data signal 53.

The receiver system 40 also includes an equalization control circuit 54, which generates a gain control signal 55 for adjusting the gain of the equalization filter 42 based on the extracted data signal 53 from the CDR circuit 52. Thus, the receiver system 40 has an analog front end and a feedback signal (the gain control signal 55) generated with digital logic (the equalization control circuit 54). The equalization control circuit 54 can be implemented with relatively simple logic circuits.

The equalization filter 42 receives the gain control signal 55 from the equalization control circuit 54 and adjusts the gain of the VGA 44 based on the gain control signal 55 to determine the equalization amount or level (i.e., distortion cancellation amount or level) of the input signal r(t). Thus, the gain of the equalization filter 42 is adjusted with the gain control signal 55 to compensate for the ISI caused by various effects of the communication channel.

The signal output by the equalization filter 42 is provided to the oversampling circuit 48 via the differential amplifier 46. The oversampling circuit 48 over samples the output of the differential amplifier 46 under the frequency control of the PLL circuit 50. For example, the oversampling circuit 48 may acquire eight over sampled bits from the amplifier 46 based on a lock frequency controlled by the PLL circuit 50. Over sampling facilitates clock and data recovery and equalization, which are factors in lowering the BER. The CDR circuit 52 specifies a center phase of an eye opening based on the over sampled bits and determines the sign of the received serial data. The CDR circuit 52 also outputs an extracted data signal 53 extracted from the over sampled bits.

The equalization control circuit 54 includes a bit width calculator 56 coupled to the CDR circuit 52 to receive the extracted data signal 53, a width error calculator 58 coupled to the bit width calculator 56, and a gain adjustment unit 60 coupled to the width error calculator 58. The gain adjustment unit 60 generates the gain control signal 55.

The bit width calculator 56 calculates the width of an isolated bit based on the extracted data signal 53. The width of an isolated bit is calculated based on the number of continuous over sampled bits having a predetermined phase (bit value of isolated bit). In other words, the bit width calculator 56 identifies a phase switch in the extracted data signal 53 as a phase switch in the received signal (r(t)) as an isolated bit, and determines the number of continuous over sampled bits having a predetermined phase. The width of isolated bit is referred to as the measured phase width MW and is provided to the width error calculator 58 as width measurement data 62. In one embodiment of the present invention, the process for calculating the width of an isolated bit uses a threshold value. When using the threshold value, the bit width calculator 56 may include a serial comparator for comparing the number of continuous over sampled bits of an isolated bit and the threshold value. Alternatively, the bit width calculator 56 may be a counter.

The width error calculator 58 compares the measured phase width MW, which is specified by the width measurement data 62, with an expected phase width EW, and to obtain a bit width error indicating the difference between the phase widths MW and EW as width error data 64. Examples of the width error calculator 58 include a subtracter circuit and a multi-bit comparator. The expected phase width EW is held in the width error calculator 58 as reference data (total number of phases in the symbol data). Alternatively, the expected phase width EW may be provided from an external circuit as a variable value corresponding to the over sampling number.

Figure 4:
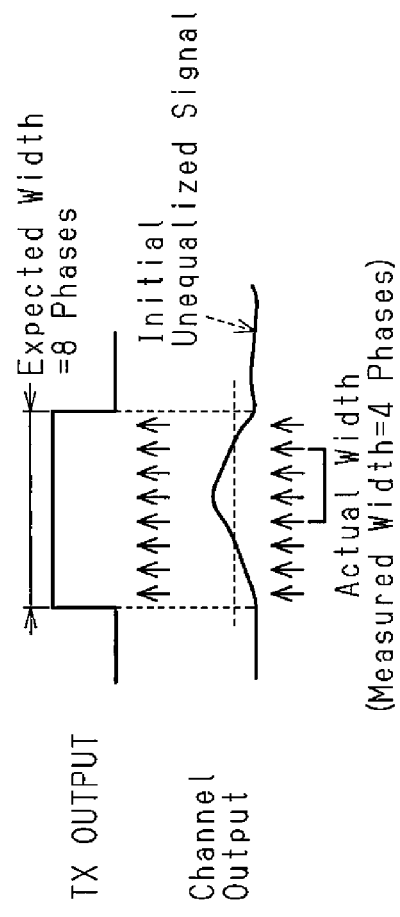
FIG. 4 is a waveform diagram showing an example of the operation of the digital equalizer shown in FIG. 3.

The operation of the width error calculator 58 will now be described with reference to FIG. 4, which shows an example of the operation of the bit width calculator 56 and the width error calculator 58 when the extracted data signal 53 contains eight over sampled bits, that is, when the over sampling number is eight. In this case, the expected phase width EW of the symbol data ("TX OUTPUT") sent to the channel is eight (phases), and the reference data of "EW=8" is held in the width error calculator 58. The bit width calculator 56 identifies the location of an isolated bit in the extracted data signal 53 and measures the width MW of the isolated bit having phase "1". For the case shown in FIG. 4, the actual phase width is four (phases) in the received data (extracted data signal 53 extracted by the CDR circuit 52 based on the input signal r(t) received by the equalization filter 42). The bit width calculator 56 thus provides the width measurement data 62 of "MW=4" to the width error calculator 58. The width error calculator 58 determines that the phase difference between the measured phase width MW and the expected phase width EW, that is, the bit width error, is four (phases). Then, the width error calculator 58 generates the width error data 64 indicating such bit width error.

The width error calculator 58 provides the gain adjustment unit 60 with the width error data 64. The gain adjustment unit 60 generates the gain control signal 55, which is the gain adjustment value for the equalization filter 42 (specifically, the VGA 44) in accordance with the bit width error specified by the width error data 64. The gain control signal 55 compensates for the distortion of the input signal r(t) caused by ISI in the equalization filter 42. In this manner, the digital equalizer of the present invention uses the bit width error of the input signal r(t) as criteria for adaptive control (gain equalization control).

The receiver system 40 that includes the digital equalizer of the illustrated embodiment has the advantages described below.

The circuits in the equalization control circuit 54 are all simple digital logic circuits. Thus, the circuit area of the digital equalizer shown in FIG. 3 is smaller than that of the conventional analog equalizer including the equalization control circuit 16 shown in FIG. 1.

A complex analog custom circuit is not required. This significantly reduces the design time compared to when designing a conventional analog equalizer. In addition, the equalization control circuit 54 is entirely formed from digital components and this has superior design flexibility and is easier to test. Accordingly, first-pass silicon may be realized in a relatively easy manner.

The digital equalization control circuit 54 may be readily implemented in a conventional receiver system without the need for complicated design changes.

The conventional analog equalizer calculates an analog parameter, such as the amplitude or slew rate, and uses the analog parameter as criteria for adaptive control (feedback equalization). In contrast, the digital equalization control circuit 54 of the present invention uses a digital parameter that is based on the width of the isolated bit as criteria for adaptive control. Accordingly, the parameter requires only a small amount of computations. Thus, a simple channel equalization scheme suitable for a high-speed serial interface is provided.

Most of the conventional digital equalizers use a complex DFE to calculate the CIR (Channel Impulse Response). However, the DFE method involves finding the weighted sum of tap coefficients and is thus computation intensive. Accordingly, even if a DFE has the advantages of a digital structure, many complex parameter computations are required. The application of a DFE to a high-speed serial interface particularly at multi-Gbps bands may produce timing critical paths. This necessitates a custom design and defeats the advantages of a digital circuit. In contrast, the digital equalizer of the present invention does not require the calculation of the CIR. The equalization control circuit 54 only requires the simple calculation of the width error (width of isolated bit). Thus, the width error may be calculated at a relatively low frequency even when applied to high-speed communications at multi-Gbps bands. Further, gain control to VGA and hence channel equalization can be done at lower frequency as compared to the serial data rate. A digital equalizer using the equalization control circuit 54 is applicable to a high-speed serial interface, such as USB3.0, SATA (Serial Advanced Technology Attachment), and PCI-express, as well as high-speed serial communication using multi-Gbps bands.

It should be apparent to those skilled in the art that the present invention may be embodied in many other specific forms without departing from the spirit or scope of the invention. Particularly, it should be understood that the present invention may be embodied in the following forms.

The digital equalizer may include the equalization control circuit 54 and a DFE. In this case, the digital equalizer selectively uses the equalization control circuit 54 and DFE. The equalization control circuit 54 may execute feedback equalization control in a restrictive manner. For instance, the equalization control circuit 54 may execute feedback equalization control only when receiving significant amounts of data. The gain adjustment unit 60 determines the gain adjustment amount, which corresponds to the bit width error. Instead, the gain adjustment amount of the gain adjustment unit 60 may be fixed. For instance, the gain adjustment unit 60 may set a minimum gain as an initial value and then monotonically increase the gain when receiving the width error data 64. A convergence circuit may be used to compensate for the effects of process-voltage-temperature (PVT). To obtain the optimum equalization gain setting, two detection patterns may be used, that is, the phase pattern ("010", "101", etc.) based on the width of the isolated bit and a training sequence pattern (symbol data sequence). When measuring the width of an isolated bit with the bit width calculator 56, the phase may be continuous or discrete. The bit width calculator 56 may also specify two or more bits in which a predetermined phase (bit value) continues in the extracted data signal 53 as an isolated bit (e.g., "0110", "1001", etc.). The equalization amount of the reception data may be verified by comparing the transition density of the reception data and the transition density of the transmission data.

The present examples and embodiments are to be considered as illustrative and not restrictive, and the invention is not to be limited to the details given herein, but may be modified within the scope and equivalence of the appended claims.

What is claimed is:

1. A channel equalizer that compensates for distortion of a signal in a communication channel, the channel equalizer comprising:
    an equalization filter that gain-equalizes a received signal received through the communication channel;
    an oversampling circuit coupled to the equalization filter for receiving and over sampling the gain-equalized signal and providing a plurality of over sampled bits;
    a CDR circuit coupled to the oversampling circuit, for determining a center phase of an eye opening based on the over sampled bits; and
    an equalization control circuit coupled to the CDR circuit, which controls the gain of the equalization filter, wherein the equalization control circuit identifies a phase switch in data obtained by the equalization filter as an isolated bit and generates a gain control signal based on a width of the isolated bit.

2. The channel equalizer according to claim 1, wherein the equalization control circuit measures a total number of over sampled bits having a predetermined phase in the data obtained by the equalization filter as the width of the isolated bit.

3. The channel equalizer according to claim 2, wherein the total number of over sampled bits comprises two or more adjacent bits in which the predetermined phase continues.

4. The channel equalizer according to claim 1, wherein:
    the equalization filter includes a variable gain amplifier and the gain control signal is used to adjust a gain amount of the variable gain amplifier.

5. The channel equalizer according to claim 1, wherein the equalization control circuit includes:
    a bit width calculator electrically connected to the CDR circuit to measure the width of the isolated bit;
    a width error calculator electrically connected to the bit width calculator to acquire a width error indicating a difference between the measured width of the isolated bit and an expected width; and
    a gain adjustment unit electrically connected to the width error calculator to generate the gain control signal based on the width error.

6. The channel equalizer according to claim 5, wherein the bit width calculator, the width error calculator, and the gain adjustment unit are digital circuits.

7. The channel equalizer of claim 5, wherein the bit width calculator identifies the isolated bits before measuring the widths of the isolated bits.

8. A receiver system for receiving a signal through a communication channel, the receiver system comprising:
    an equalization filter including a variable gain amplifier that gain-equalizes the received signal;
    an oversampling circuit coupled to the equalization filter, which acquires a plurality of over sampled bits from the gain equalized received signal;
    a CDR circuit coupled to the oversampling circuit, which specifies a center phase of an eye opening based on the over sampled bits and determines the sign of the received signal; and
    an equalization control circuit coupled to the CDR circuit, which identifies a phase switch in the plurality of over sampled bits as an isolated bit and generates a gain control signal based on a width of the isolated bit, wherein the gain control signal is used to adjust a gain amount of the variable gain amplifier.

9. The receiver system according to claim 8, wherein the equalization control circuit measures a total number of bits having a predetermined phase in the plurality of over sampled bits as the width of the isolated bit.

10. The receiver system according to claim 9, wherein the total number of bits having the predetermined phase comprises two or more adjacent bits in which the predetermined phase continues.

11. The receiver system according to claim 8, wherein the equalization control circuit includes:
    a bit width calculator electrically connected to the CDR circuit to measure the width of the isolated bit;
    a width error calculator electrically connected to the bit width calculator to acquire a width error indicating a difference between the measured width of the isolated bit and an expected width; and
    a gain adjustment unit electrically connected to the width error calculator to generate the gain control signal based on the width error.

12. The receiver system according to claim 11, wherein the bit width calculator, the width error calculator, and the gain adjustment unit are digital circuits.

* * * * *